United States Patent
Tiemann et al.

(10) Patent No.: US 11,933,643 B2
(45) Date of Patent: Mar. 19, 2024

(54) INDUCTIVE ANGLE MEASURING DEVICE

(71) Applicant: DR. JOHANNES HEIDENHAIN GmbH, Traunreut (DE)

(72) Inventors: Marc Oliver Tiemann, Tettenhausen (DE); Martin Heumann, Traunstein (DE); Alexander Frank, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 2 days.

(21) Appl. No.: 17/969,004

(22) Filed: Oct. 19, 2022

(65) Prior Publication Data
US 2023/0129608 A1    Apr. 27, 2023

(30) Foreign Application Priority Data

Oct. 25, 2021    (EP) .................................... 21204416

(51) Int. Cl.
G01D 5/20    (2006.01)
G01D 5/244    (2006.01)
G01D 5/249    (2006.01)

(52) U.S. Cl.
CPC ......... G01D 5/2053 (2013.01); G01D 5/2073 (2013.01); G01D 5/24438 (2013.01); G01D 5/2497 (2013.01)

(58) Field of Classification Search
CPC ............... G01D 5/2053; G01D 5/2073; G01D 5/24438; G01D 5/2497
See application file for complete search history.

(56) References Cited

U.S. PATENT DOCUMENTS 6,054,851 A    4/2000    Masreliez et al.
8,159,215 B2 *    4/2012    Kobayashi ........... G01D 5/2013
                                                                324/207.25

(Continued)

FOREIGN PATENT DOCUMENTS

DE    19803249 A1    8/1998
DE    102013218768 A1    3/2015
EP    3611478 A1    2/2020

OTHER PUBLICATIONS

European Search Report issued in corresponding EP Patent Application No. 21204416.8, dated Mar. 18, 2022, pp. 1-4.

*Primary Examiner* — Walter L Lindsay, Jr.
*Assistant Examiner* — Milton Gonzalez
(74) *Attorney, Agent, or Firm* — CARTER, DELUCA & FARRELL LLP

(57) ABSTRACT

An inductive angle measuring device includes a scanning element and a scale element having scale tracks. First and third scale tracks have an equal first number of scale structures, and a second scale track has a different number of scale structures. The scale tracks are arranged circumferentially and concentrically about an axis, such that the first scale track is located radially inwardly, the second scale track is located radially between the first scale track and the third scale track, and the third scale track is located radially outwardly. The scanning element includes receiver conductors by which the signals having angle-related signal periods can be generated. The first signal period is equal to the third signal period. An overall signal can be generated from the first signal and the third signal and can be combined with the second signal for determining absolute angle position information.

18 Claims, 5 Drawing Sheets

(56) References Cited

U.S. PATENT DOCUMENTS

| | | |
|---|---|---|
| 9,234,771 B2 * | 1/2016 | Sasaki .................. G01D 5/2452 |
| 2011/0025310 A1 | 2/2011 | Moura et al. |
| 2022/0065662 A1 * | 3/2022 | Lu ........................... G01D 5/20 |

* cited by examiner

INDUCTIVE ANGLE MEASURING DEVICE

CROSS-REFERENCE TO RELATED APPLICATIONS

The present application claims priority to Application No. 21204416.8, filed in the European Patent Office on Oct. 25, 2021, which is expressly incorporated herein in its entirety by reference thereto.

FIELD OF THE INVENTION

The present invention relates to an inductive angle measuring device, e.g., for determining absolute angle position information and an absolute angular position.

BACKGROUND INFORMATION

Inductive angle measuring devices are used, for example, as angle measuring instruments for determining the angular position of two machine components that are rotatable relative to each other. For inductive angle measuring devices, exciter lines and receiver conductors are often commonly applied to a typically multilayer circuit board fixedly attached to a stator of an angle measuring instrument, for example. Opposite the circuit board is a scale element on which scale structures are mounted and to which the rotor of the angle measuring instrument is attached for conjoint rotation. When an AC exciter current is applied to the exciter lines, signals dependent on the angular position are generated in the receiver conductors during the relative rotation between the rotor and stator. The signals are processed further in an electronic evaluation unit. At least two tracks having scale structures are often provided on the scale element for generating absolute angle position information, have different scale periods, and are evaluated according to the Nonius or beat principle.

Such inductive angle measuring devices are often used as measuring devices for electric drives, for determining the relative motion or relative position of corresponding machine components. In this case, the generated angular position values are fed to a subsequent electronic unit for actuating the drives by a corresponding interface arrangement.

German Patent Document No. 10 2013 218 768 describes an inductive position measuring device for which a tilting of a scanning unit about an axis parallel to the axis of rotation relative to a scale can be determined by an additional scale track. The Moiré angle thus determined can be used in an evaluation unit for correcting the scanning signals and the absolute position.

SUMMARY

Example embodiments of the present invention provide an inductive angle measuring device by which an absolute angular position between two machine components that are rotatable relative to each other can be precisely determined.

According to an example embodiment of the present invention, an inductive angle measuring device includes a scanning element and a scale element. The scale element includes a first scale track having first scale structures, a second scale track having second scale structures, and a third scale track having third scale structures; the scale structures are each arranged periodically. The first scale track includes a first quantity n1 of scale structures, and the third scale track includes a third quantity n3 of scale structures, each across a predetermined or specified, constant angle range of equal size. The first quantity n1 is equal to the third quantity n3 (i.e., n1=n3). In contrast, the second scale track includes a second quantity n2 of scale structures, different from the first quantity n1 and the second quantity n3 (i.e., n1=n3≠n2) across the predetermined angle range of equal size. The scale tracks are further disposed circumferentially and concentrically about an axis, such that the first scale track is disposed radially inwardly, the second scale track is disposed radially between the first scale track and the third scale track, and the third scale track is disposed radially outwardly. The scanning element includes an exciter line. The scanning element also includes a first receiver conductor, a second receiver conductor, and a third receiver conductor. The first scale track can be scanned by the first receiver conductor for generating a first signal having a signal period relating to the angle. The second scale track can be scanned by the second receiver conductor for generating a second signal having a second signal period relating to the angle, and the third scale track can be scanned by the third receiver conductor for generating a third signal having a third signal period relating to the angle. The first signal period is equal to the third signal period with respect to the angle. An overall signal can be generated from the first signal and the third signal and can be combined with the second signal for determining absolute angle position information.

The scale element may include scale tracks extending over an entire 360°, so that in most cases the predetermined angle range therefore extends over 360°. The angle measuring device may also be adapted to measure only limited angular positions. In this case, the predetermined angle range can be adapted to the angular range of less than 360°. The first, second, and third quantities n1, n2, n3 of scale structures can be considered as quantities n1, n2, n3 normalized to an angle range.

The receiver conductors may have a spatially periodic, sinusoidal curve along a circular arc, having a period matched to the period length of the scale structures to be scanned.

The scanning element and the scale element may be disposed axially opposite each other and spaced apart from each other by an air gap extending in the axial direction.

The first scale track may have a first radial extent H1, the third scale track may have a third radial extent H3, and the first radial extent H1 may be greater than the third radial extent H3 (i.e., H1>H3). A radial extent H3 is a length, for example, measured in millimeters, in the radial direction.

The first scale track may be disposed at a phase offset relative to the third scale track in the circumferential direction. The offset may be greater than 150° and less than 210°. The phase offset may be between 170° and 190°. In other words, for example, the first and third scale tracks (e.g., the scale structures thereof) are disposed relative to each other with respect to the circumferential or measuring direction such that the first and third signals have an electrical phase offset in the range between 150° and 210°, e.g., between 170° and 190°.

The angle measuring device may include an analog electrical circuit by which the overall signal can be generated by linking or connecting the first and the third signals.

The first signal and the third signal are linked to each other so that the overall signal arises therefrom. The overall signal is, for example, generated by a subtraction or addition operation.

The angle measuring device may include a further circuit by which the absolute angle position information can be generated from the overall signal and the second signal by a Nonius method. The further circuit may be implemented as a digital circuit, for example.

The scanning element may include a radially inner first scanning track and a radially outer third scanning track, in which the first scanning track includes the first receiver conductor and at least one segment of the exciter line disposed at an effective first radial distance from the first receiver conductor. The at least one segment thus extends radially offset from the first receiver conductor at the effective first radial distance. The third scanning track includes the third receiver conductor and at least one further segment of the exciter line disposed at an effective third radial distance from the third receiver conductor. The first radial distance is greater than the third radial distance. The exciter lines may extend in the measuring direction or in the segments along the measuring direction.

The second signal period is, for example, greater than the first signal period and greater than the third signal period.

The scanning tracks may be arranged so that the tracks include a plurality of receiver conductors, and two receiver conductors of one scanning track may have a phase offset, e.g., of 90°, to each other.

The angle measuring device further includes an electronic circuit by which an electrical exciter current can be generated in the exciter lines. The exciter current may travel in the same direction in directly adjacent segments of the exciter line at a particular point in time.

The scale element may be arranged so that the first scale track extends along a first circular arc and has a first radial centerline having a first radius r1'. The second scale track further extends along a second circular arc and has a second radial centerline having a second radius r2'. Additionally, the third scale track extends along a third circular arc and has a third radial centerline having a third radius r3'. The scale element is arranged so that the distance between the first radial centerline and the second radial centerline is not equal to the distance between the third radial centerline and the second radial centerline (i.e., (r2'−r1')≠(r3'−r2')). The distance between the first radial centerline and the second radial centerline is, for example, less than the distance between the third radial centerline and the second radial centerline (i.e., (r2'−r1')<(r3'−r2')).

The scanning element may be arranged so that the scale element cannot be scanned over a full 360° at the time of scanning, but rather only one segment or a plurality of segments arranged offset in the circumferential direction can be scanned at the time of scanning.

The segment or the corresponding plurality of segments may extend over an angle of less than 180°, e.g., less than 120° or less than 90°. The first receiver conductor, the second receiver conductor, and the third receiver conductor may extend over an angle of less than 180°, e.g., less than 120° or less than 90°.

The first receiver conductor may include a first period relating to the angle, the second receiver conductor may include a second period relating to the angle, and the third receiver conductor may include a third period relating to the angle. The first period is equal to the third period, relating to the angle, or is exactly the same size as the third period.

Further features and aspects of example embodiments of the present invention are described in more detail below with reference to the appended schematic Figures.

DETAILED DESCRIPTION

Figure 1:
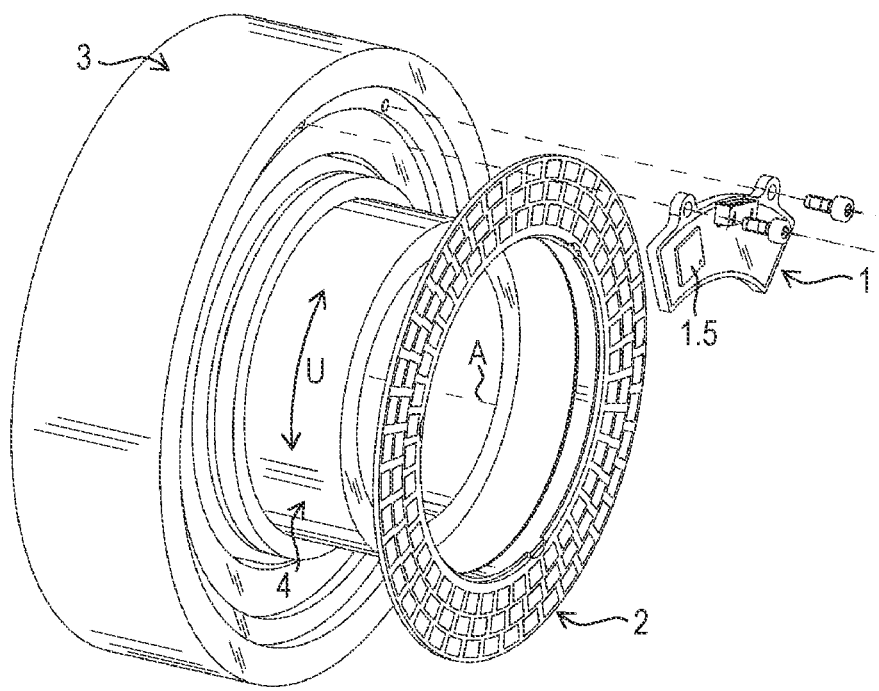
FIG. 1 is a perspective exploded view of an angle measuring device.

FIG. 1 illustrates an angle measuring device according to an example embodiment of the present invention. The angle measuring device includes a scanning element 1 that is attachable to a housing 3 and a scale element 2 or a scale. The scale element 2 can be connected, for conjoint rotation, to a shaft 4 rotatable about an axis A relative to a housing. The angle measuring device is adapted to detect an absolute angular position in the circumferential direction corresponding to a measuring direction U between the scanning element 1 and the scale element 2.

Figure 2:
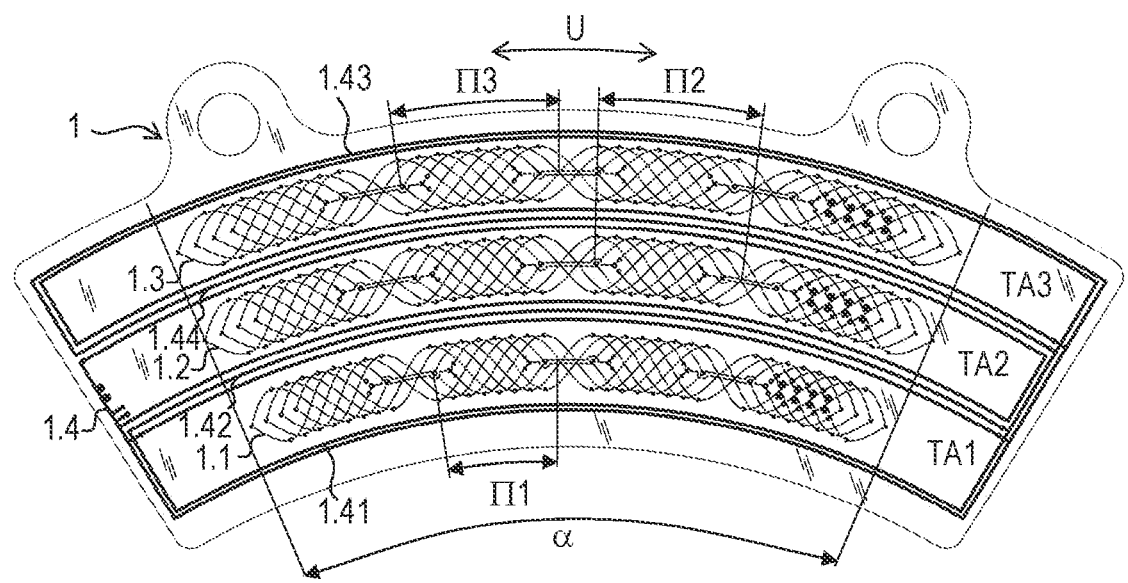
FIG. 2 is a plan view of a scanning element.

The scanning element 1 is arranged as a circuit board that includes a plurality of layers and is configured to scan the scale element 2. The scanning element 1 illustrated in FIG. 2 includes an exciter line 1.4, arranged, for example, as a circumferential conductor having a plurality of windings. The scanning element 1 further includes a radially inner first scanning track TA1, which includes first receiver conductors 1.1 and two segments 1.41, 1.42 of the exciter line 1.4. The two segments 1.41, 1.42 extend radially on both sides of the first receiver conductors 1.1. The scanning element 1 further includes a second scanning track TA2 and two segments 1.42, 1.44 of the exciter line 1.4, in which the two segments 1.42, 1.44 extend radially on both sides of the second receiver conductors 1.2. Additionally, the scanning element 1 includes a radially outer third scanning element TA3, which includes third receiver conductors 1.3 and two segments 1.43, 1.44 of the exciter line 1.4. The two segments 1.43, 1.44 extend radially on both sides of the third receiver conductors 1.3. The receiver conductors 1.1, 1.2, 1.3 of each scanning track TA1, TA2, TA3 are arranged at different layers having interlayer connections, so that undesired short circuits are avoided at intersection points. As illustrated, a plurality of layers are provided in the circuit board structure. The receiver conductors 1.1, 1.2, 1.3 of each scanning track TA1, TA2, TA3 have a spatially periodic path arranged substantially in a sinusoidal or sine-like manner. The abscissa of the associated sinusoidal lines extends along a circle about the axis A. Length parameters in the circumferential and measuring direction U are indicated below by angular dimensions. The first receiver conductors 1.1 correspondingly have a first period Π1 relating to the angle. For example, the first period Π1 may be equal to 9.00°.

The second receiver conductors 1.2 have a second period Π2 relating to the angle, different from the first period Π1, in which, for example, Π2=9.23°≠Π1 and Π2>Π1.

The third receiver conductor paths 1.3, in contrast, have a third period Π3 relating to the angle corresponding to the first period Π1, e.g., Π3=Π1=9.00°.

In the exemplary embodiment illustrated, each of the receiver conductors 1.1, 1.2, 1.3 extends through four full (sinusoidal) periods Π1, Π2, Π3. Within the scanning track TA1, TA2, TA3 thereof, the receiver conductors 1.1, 1.2, 1.3 are each offset relative to each other along the measuring direction U. Receiver conductors 1.1, 1.2, 1.3 adjacent to each other in the circumferential direction U are arranged offset to each other by ⅛ of the periods Π1, Π2, Π3 within the scanning track TA1, TA2, TA3 thereof. The receiver conductors 1.1, 1.2, 1.3 in each scanning track TA1, TA2, TA3 are electrically connected so that the conductors can ultimately provide signals for each scanning track TA1, TA2, TA3, each phase-offset by 90°. The receiver conductors 1.1, 1.2, 1.3 are each interrupted by gaps, for example. The configuration described herein can contribute to reducing the sensitivity with respect to a relative tilt about an axis having a radial orientation (e.g., pitch tilt).

The scanning element is arranged so that the scale element can be scanned over a segment extending only over an angle α having a magnitude of approximately 45°, for example.

Figure 3:
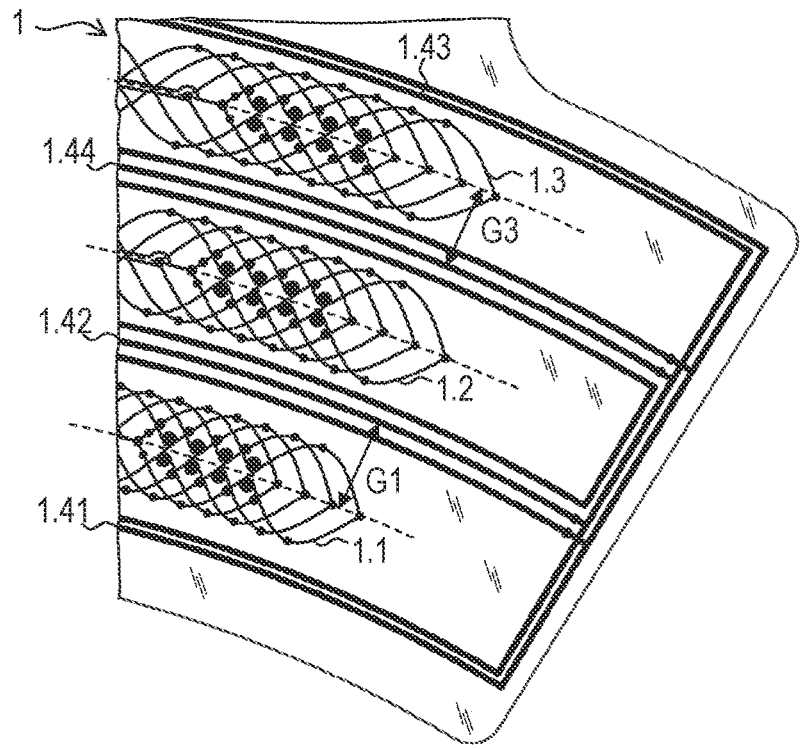
FIG. 3 is an enlarged view of the scanning element.

FIG. 3 is an enlarged view of the scanning element 1. The dashed lines represent the radial centers of the receiver conductors 1.1, 1.2, 1.3, e.g., the abscissas of the corresponding sinusoidal curves about the axis A, in which the abscissa extends along a circle. The segments 1.41, 1.42, 1.43, 1.44 of the exciter line 1.4 may include one conductor or, as illustrated, a plurality of conductors.

Figure 4:
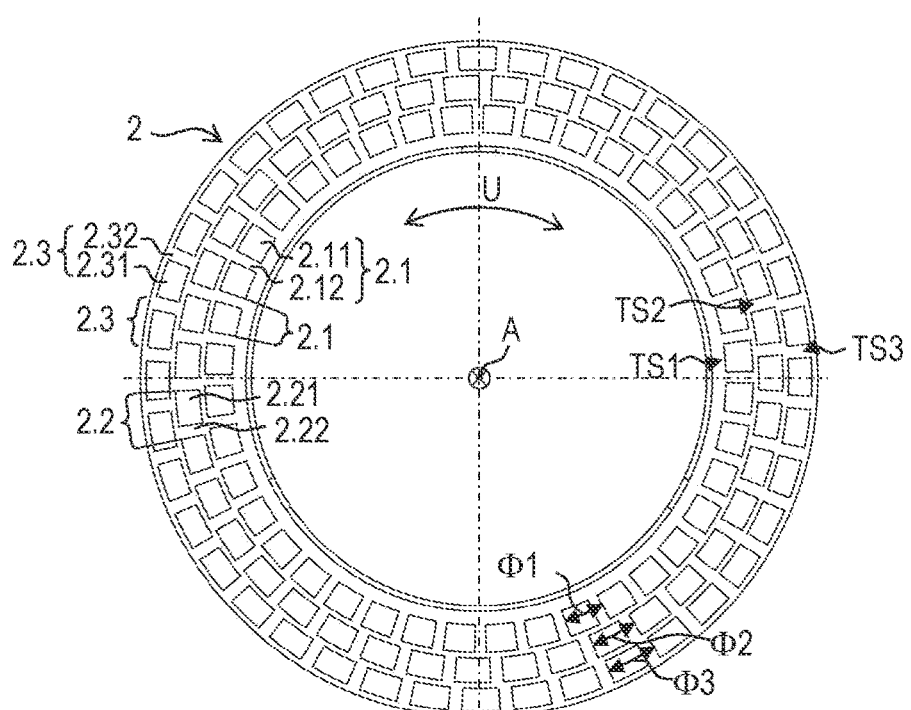
FIG. 4 is a plan view of a scale element.

The scale element 2 is shown in a plan view in FIG. 4. The scale element includes a substrate made of epoxy resin, for example, on which three scale tracks TS1, TS2, TS3 are arranged. The scale tracks TS1, TS2, TS3 are circular and are disposed circumferentially in the measuring direction U and concentrically with respect to the axis of rotation A at different radii. The first scale track TS1 is disposed radially inwardly, the second scale track TS2 is disposed radially between the first scale track TS1 and the third scale track TS3, and the third scale track TS3 is disposed radially outwardly.

The scale tracks TS1, TS2, TS3 each include a periodic sequence of scale structures 2.1, 2.2, 2.3 arranged as electrically conductive scale regions 2.11, 2.21, 2.31, for example, between which non-conductive scale regions 2.12, 2.22, 2.32 are arranged. Copper is applied to the substrate, for example, as the material for the electrically conductive scale regions 2.11, 2.21, 2.31. In contrast, the substrate is not coated in the non-conductive scale regions 2.12, 2.22, 2.32 between the conductive scale regions 2.11, 2.21, 2.31.

Altogether, the first scale track TS1 includes a first number n1 of forty periodically disposed first scale structures 2.1 having exactly as many non-conductive regions disposed therebetween the same over an angle range of 360° or 2π. The third scale track TS3 includes an equal number n3 of periodically arranged third scale structures 2.3. For example, n1=n3=40.

The second scale track TS2, in contrast, includes a second number n2 of thirty-nine periodically disposed second scale structures 2.2 over the 360°, e.g., n2=39.

The second scale track TS2 thus further includes a second number n2 of scale structures 2.2, different from the first number n1 and the third number n3, over the angle range of 360°. That is, for example, n2<n1 and n2<n3.

Figure 5:
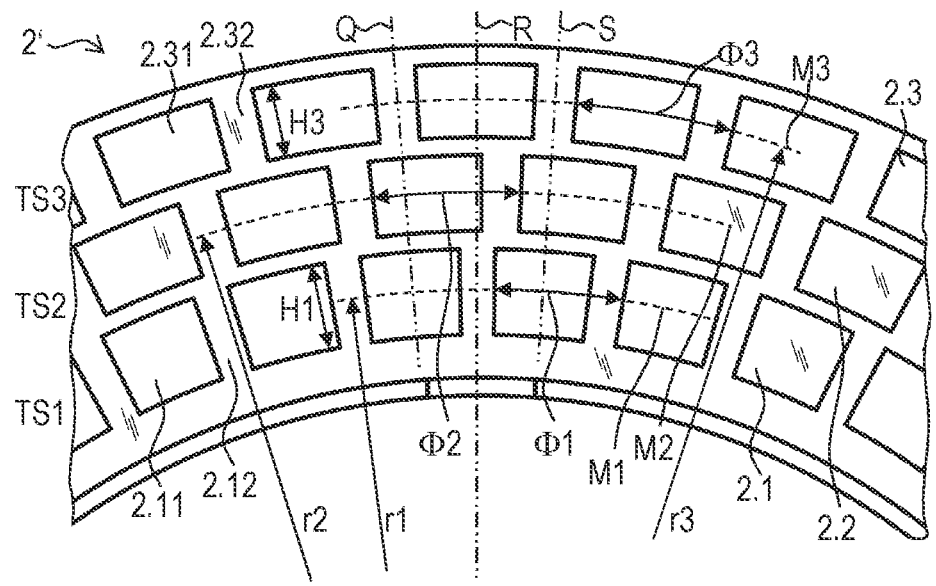
FIG. 5 is an enlarged view of the scale element illustrated in FIG. 4.

The scale element 2 is illustrated in more detail in an enlarged view in FIG. 5. A first radial centerline M1 of the first scale track TS1 is arranged along a circle having the radius r1. The radial centerlines M2, M3 of the second scale track TS2 and the third scale track TS3 are arranged correspondingly along circles having the radii r2 and r3, respectively. In the illustrated example embodiment, the scale tracks TS1, TS2, TS3 are each spaced apart at equal distances from each other.

As illustrated in FIG. 5, each of the first scale structures 2.1 extends over a first angle range Φ1 of 9.00° (i.e., 360°/n1), for example. Each of the second scale structures 2.2. extends correspondingly over a second angle range Φ2 of 9.23° (i.e., 360°/n2), for example. Additionally, a third angle range Φ3 over which each of the third scale structures 2.3 extends is also 9.00° (i.e., 360°/n3), for example. Because, however, the first radius r1 is less than the third radius r3, the scale period measured in millimeters is shorter in the first scale track TS1 than in the third scale track TS3.

The first scale track TS1 is disposed relative to the third scale track TS with respect to the measuring direction U such that the centers of the conductive scale regions 2.11 of the first scale track TS1 and the centers of the non-conductive scale regions 2.32 of the third scale track TS3 are arranged on radially aligned lines Q, S disposed offset from each other by the first angle range Φ1. In addition, the centers of the non-conductive scale regions 2.12 of the first scale track TS1 and the centers of the conductive scale regions 2.31 are arranged on a radially aligned line R. The line R is located centered between the lines Q, S, i.e., spaced apart from each by ½ Φ1. As a result, the first scale track TS1 is disposed at a phase offset of 180° relative to the third scale track TS3 in the circumferential direction.

The first scale track TS1 and the conductive scale regions 2.11 thereof further have a first radial extent H1 of 4.8 mm in the illustrated example embodiment. The third scale track TS3 and the conductive scale regions 2.31 thereof have a third radial extent H3 of 4.09 mm, for example. The first radial extent H1 is accordingly greater than the third radial extent H3, so that H1>H3.

Figure 6:
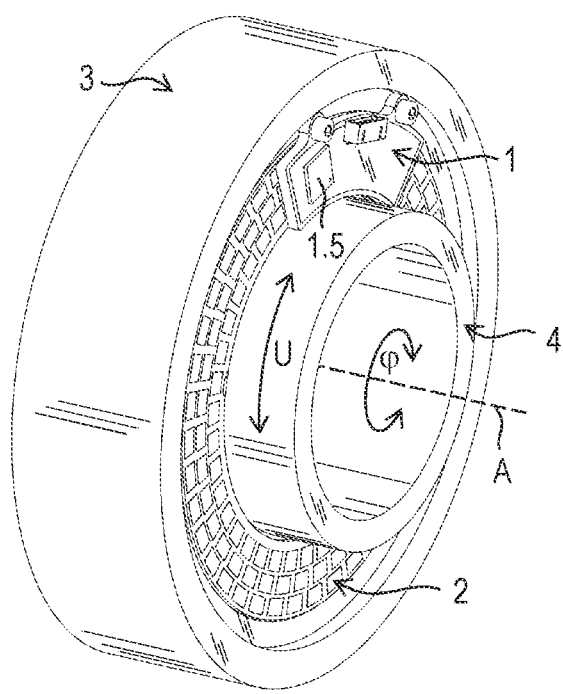
FIG. 6 is a perspective view of the angle measuring device in an assembled state.

In the assembled state illustrated in FIG. 6, the scanning element 1 and the scale element 2 are arranged opposite each other, so that the axis A passes through the center point of both elements. For a relative rotation between the scale element 2 and the scanning element 1, first, second, and third signal S1, S2, S3 depending on the corresponding angular position can be generated in the receiver conductor paths 1.1, 1.2, 1.3 by induction effects. A prerequisite for forming corresponding signals S1, S2, S3 is that the exciter line 1.4 generates a time-variable electromagnetic excitation field in the region of the scanned scale tracks TS1, TS2, TS3. In the illustrated example embodiment, the exciter line 1.4 is implemented as a plane-parallel current-carrying conductor path having a plurality of windings. The scanning element 1 includes an electronic circuit, for example, including an ASIC component 1.5 (see, e.g., FIGS. 1 and 6). The electronic circuit of the scanning element 1 is not only configured as an evaluating element, but also as an excitation control element, under the control of which the exciter current is generated and flows through the exciter line 1.4.

When an exciter current flows through the exciter line 1.4, a tube-shaped or cylindrically oriented electromagnetic field forms about the exciter line 1.4. The field lines of the electromagnetic field thus generated extend in the form of concentric circles about the exciter line 1.4, and the direction of the field lines depends, e.g., in a conventional manner, on the current direction in the exciter lines 1.4. The current direction of the segments 1.41, 1.42, 1.43, 1.44 of the exciter line 1.4 adjacent to a common receiver conductor 1.1, 1.2, 1.3 may be selected so that the field lines in the region of the receiver conductors 1.1, 1.2, 1.3 each have the desired orientation. When a plurality of segments 1.41, 1.42, 1.43, 1.44 of the exciter line 1.4 are arranged parallel to each other, as in the illustrated example embodiment, the effect is comparable to when a single exciter line having a correspondingly sized cross section carries a greater current flow.

For the operating principle of the angle measuring device, e.g., for the magnitude of the received level of the first and third signals S1, S3, it is significant how great a first effective radial distance G1 and a third effective radial distance G3 are within the first scanning track TA1 and the third scanning track TA3 respectively (see, e.g., FIG. 3). The first radial distance G1 for the first scanning track TA1 is the distance between the radial center of the first receiver conductor 1.1 and the radial center of the segment 1.42 (or of the segment 1.41) of the exciter line 1.4. For the special case that the exciter line 1.4 in the respective segment is made of only one conductor, the radial center of the conductor is definitive. In the illustrated example embodiment, a segment 1.41, 1.42, 1.43, 1.44 always includes a plurality of conductors extending in parallel, so that the center of the plurality of conductors extending in parallel can be considered as the radial center of the segments 1.41, 1.42, 1.43, 1.44. The local effectiveness of the exciter line 1.4 is decisive for defining the effective radial distances G1, G3. In the present context, it must be considered that a plurality of conductors together generate a magnetic field according to the principle of superposition. The effective radial distance G1, G3 is accordingly the distance between the radial center of the receiver conductors 1.1, 1.3 and the center of a virtual conductor for generating an identical magnetic field as a conductor bundle of the same scanning track TA1, TA3. The third effective radial distance G3 for the third scanning track TA3 can also be defined accordingly.

Figure 7:
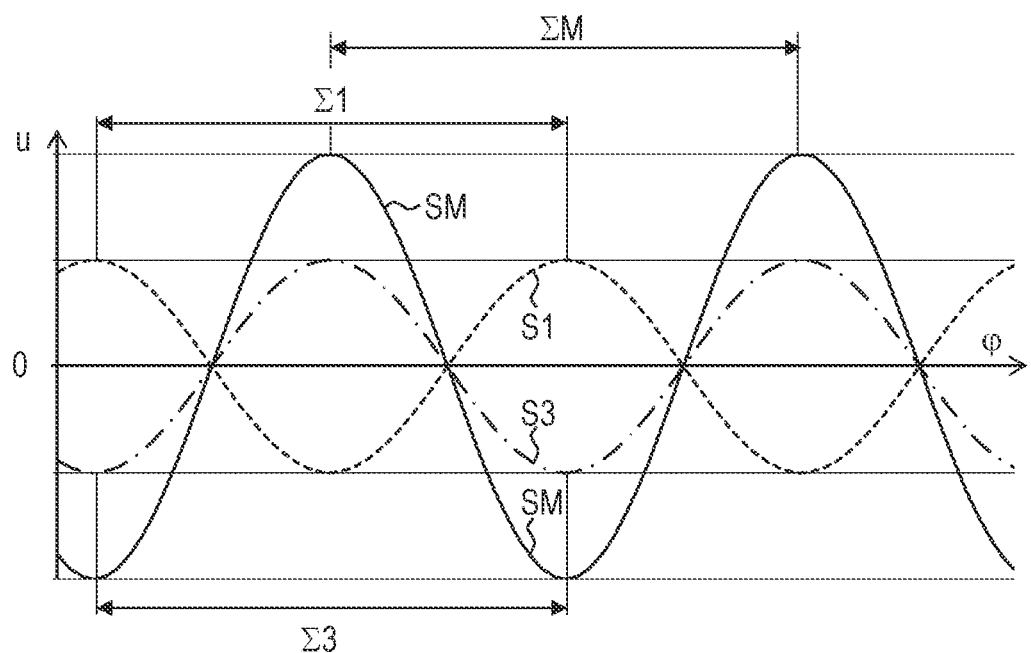
FIG. 7 illustrates the curves of a first signal, a third signal, and an overall signal.
Figure 8:
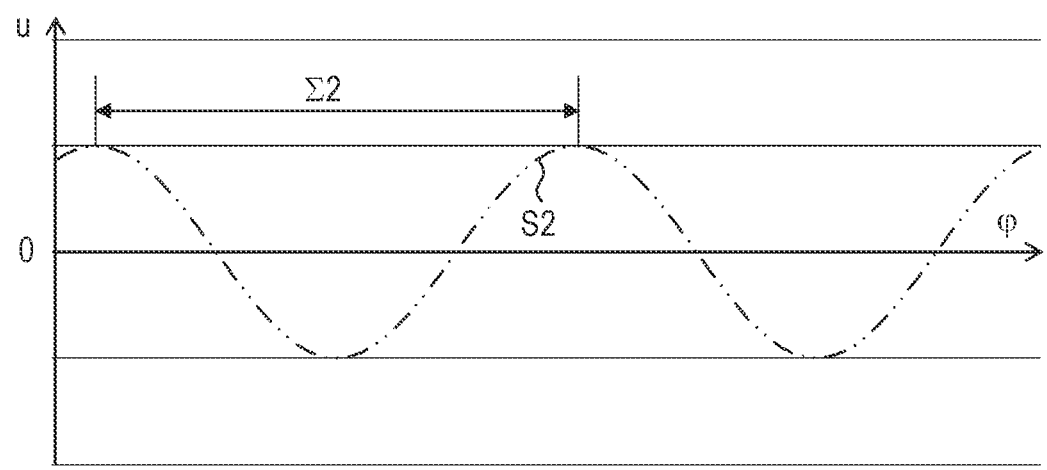
FIG. 8 illustrates the curve of a second signal.

Voltages are induced in the receiver conductors 1.1, 1.2, 1.3 by the exciter current as a function of the angular position of the scale element 2, and the voltages are referred to as first, second, and third signals S1, S2, S3. In FIGS. 7 and 8, the angle φ (see, e.g., FIG. 6) is plotted on the abscissa and the signal level u is plotted on the ordinate. FIGS. 7 and 8 each illustrate the conditions at which the tilt or Moiré angle is equal to zero, i.e., ideal installation conditions.

In FIG. 7, the dashed line illustrates the curve of the first signal S1 generated by the first receiver conductor 1.1 of the first scanning track TA1 when the track scans the first scale track TS1. The dot-dash line correspondingly illustrates the curve of the third signal S3 generated by the third receiver conductor 1.3 of the third scanning track TA3 when the track scans the third scale track TS3. Due to the configuration of the first scale track TS1 and of the third scale track TS3 and the relative arrangement thereof (e.g., of the scale structures 2.1, 2.3) to each other, the first signal S1 has a phase offset of 180° relative to the third signal S3. The first signal S1 further has a first signal period $\Sigma 1$ in relation to the angle φ. The third signal S3 also has a third signal period $\Sigma 3$ in relation to the angle able to be generated by the third receiver conductor 1.3. The first signal period $\Sigma 1$ has equal magnitude to the third signal period $\Sigma 3$, i.e., $\Sigma 1 = \Sigma 3$.

An overall signal SM can be generated from the first signal S1 and the third signal S3 (e.g., SM=S3−S1). For this purpose, the first signals S1 of the first scanning track TA1, e.g., of the first receiver conductor 1.1, are connected to the third signal S3 of the third scanning track TA3, e.g., of the third receiver conductor 1.3, so that an overall signal SM arises due to such a linking. In the illustrated example embodiment, this is implemented by a simple analog circuit on the scanning element 1, in which a difference is formed by the link, so that the overall signal SM could also be referred to as a difference signal. Due to the phase offset of 180°, interfering components, for example, due to feedthrough effects or harmonic signals, have opposite signs and are thus eliminated or at least reduced. It is important that the first and third signals S1, S3 are combined, e.g., subtracted, at identical phases. The overall signal SM has a signal period $\Sigma M$ of equal magnitude to the first signal period $\Sigma 1$ or the third signal period $\Sigma 3$, i.e., $\Sigma M = \Sigma 1 = \Sigma 3$.

Moiré errors arise due to tilting of the scanning element 1 relative to the scale element 2 about a tilt axis having a component parallel to the axis A. In case of tilting of the scanning element 1 relative to the scale element 2 in the sense of a Moiré motion, the curve of the first signal S1 along the abscissa and the curve of the third signal S3 correspondingly shift in opposite directions. The overall signal SM remains largely unchanged despite the geometric deviation from the ideal configuration. The overall signal SM thus generated, e.g., the phase thereof, is therefore nearly independent of Moiré errors caused by tolerances. For conventional angle measuring devices, such tilting would lead to a phase difference arising between the fine track signal and the coarse track signal, leading to incorrectly combining the two signals and to erroneous subsequent processing. Ultimately, incorrect angle position information would thereby arise.

Avoiding Moiré errors is particularly important in the illustrated example embodiment because the scanning element 1 is implemented so that the scale element 2 can be scanned by the scanning element only over a limited angle, e.g., over a segment, and not over the entire circumference. For scanning extending over the entire circumference, a Moiré error would largely compensate for itself.

For a change in the axial air gap between the scanning element 1 and the scale element 2, for example, due to heating of the shaft 4, the distance behavior of the first scanning track TA1 would differ from the distance behavior of the third scanning track TA3, absent special measures. The effect would prevent reducing Moiré errors. In order to minimize the undesired effect, the effective first radial distance G1 is greater than the effective third radial distance G3, i.e., G1>G3.

Due to this configuration, the influence of changes in distance on the corresponding amplitudes and signal levels is harmonized. The configuration described above also has a supporting effect, according to which the first radial extent H1 is greater than the third radial extent H3 on the side of the scale element 2.

Angular position values of greater resolution can be generated for the relative angular position by the first receiver conductors 1.1 and the third receiver conductors 1.3, while angular position values of lesser resolution can be generated by the second receiver conductors 1.2. Therefore, the second signal period $\Sigma 2$ of the second signal S2 (see, e.g., FIG. 8) is greater than the first signal period $\Sigma 1$ or the third signal period $\Sigma 3$, i.e., $\Sigma 2 > \Sigma 1$, $\Sigma 2 > \Sigma 3$.

The overall signal SM, largely free of Moiré errors, can thus be considered to be a virtual fine-track signal that is able to be combined with the coarser angle-related second signal S2 for determining absolute angle position information. To this end, in the illustrated example, a digital calculation is performed in the ASIC 1.5 by a Nonius or beat method.

Absolute angle position information largely free of Moiré errors and thus ensuring increased measurement accuracy can thus be generated by the angle measuring device arranged in this manner, even if the scanning element 1 scans the scale element 2 only over a relatively short segment and relatively large installation tolerances can be permitted.

Figure 9:
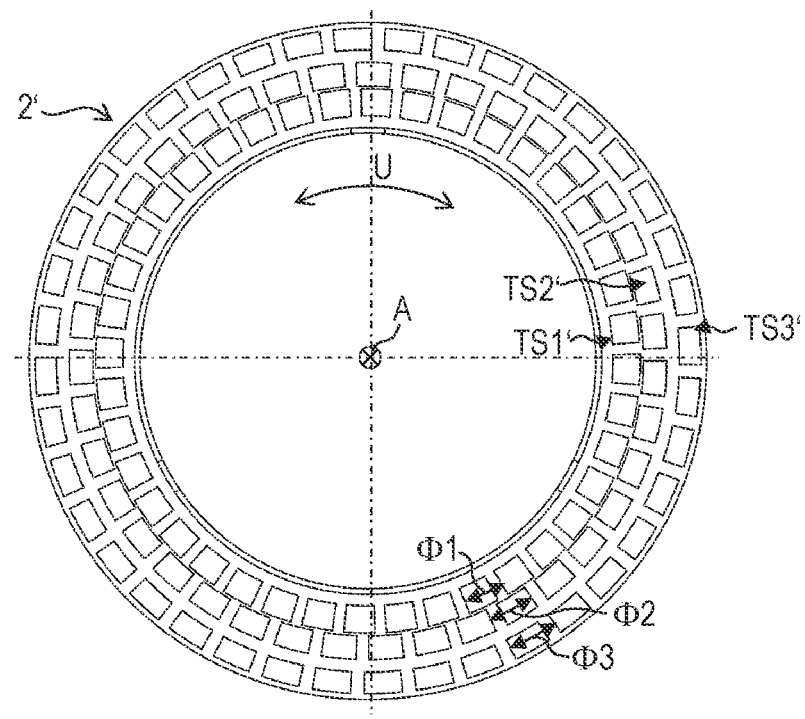
FIG. 9 is a plan view of a scale element.
Figure 10:
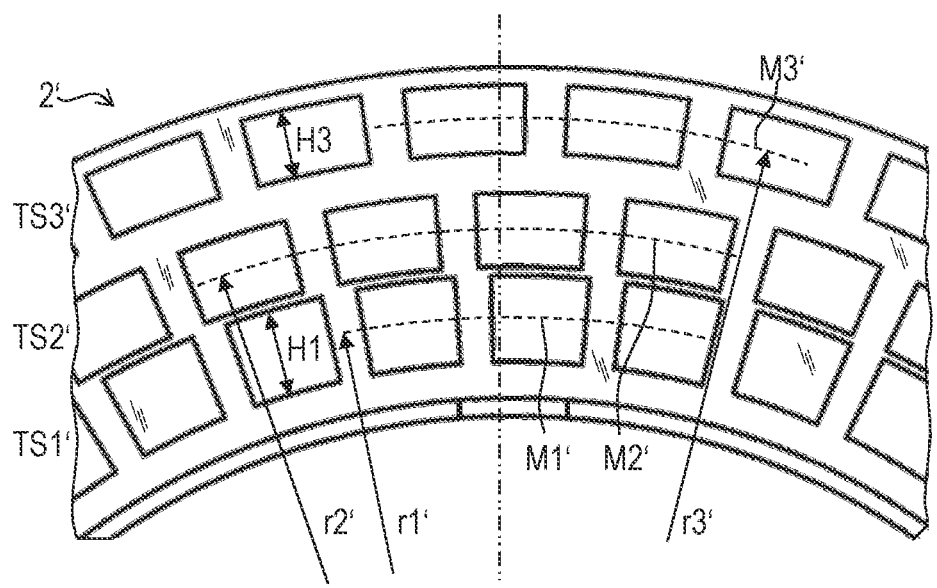
FIG. 10 is an enlarged view of the scale element illustrated in FIG. 9.

A further example is described with reference to FIGS. 9 and 10. This example embodiment differs from that described above in that the scale element 2' is configured such that the first, inner scale track TS1' is arranged closer to the second scale track TS2' than the third, outer scale track TS3'. The first scale track TS1' extends along a first circular arc and has a first radial centerline M1' having a first radius r1. The second scale track TS2' extends along a second circular arc and has a second radial centerline M2' having a second radius r2'. Additionally, the third scale track TS3' extends along a third circular arc and has a third radial centerline M3' having a third radius r3'. Accordingly, (r2'−r1')≠(r3'−r2'), e.g., (r2'−r1')<(r3'−r2').

Otherwise, the scale element 2' is substantially identical in comparison with the scale element 2. The radii of the scanning tracks of the scanning element in the example embodiment illustrated in FIGS. 9 and 10 are adapted to the radii r1', r2', r3' and the paths of the scale tracks TS1', TS2', TS3'.

What is claimed is:

1. An inductive angle measuring device, comprising:
   a scale element including a first scale track having periodically-arranged first scale structures, a second scale track having periodically-arranged second scale structures, and a third scale track having periodically-arranged third scale structures disposed periodically, the first scale track and the third scale track including an equal first number of scale structures over a predetermined angle range, the second scale track including a second number of scale structures different from the first number, the first, second, and third scale tracks being arranged concentrically about an axis, the first scale track being arranged radially inwardly, the second scale track being arranged radially between the first scale track and the third scale track, the third scale track being arranged radially outwardly; and
   a scanning element including an exciter line, a first receiver conductor adapted to scan the first scale track to generate a first signal having an angle-related first signal period, a second receiver conductor adapted to scan the second scale track to generate a second signal having an angle-related second signal period, and a third receiver conductor adapted to scan the third scale track to generate a third signal having an angle-related third signal period;
   wherein the first signal period is equal to the third signal period and an overall signal is generatable from the first signal and the third signal and is combinable with the second signal to determine absolute angle position information; and
   wherein the first scale track has a first radial extent, the third scale track has a third radial extent, the first radial extent being greater than the third radial extent.

2. The inductive angle measuring device according to claim 1, wherein the first scale track is arranged in a circumferential direction at a phase offset of greater than 150° and less than 210° relative to the third scale track.

3. The inductive angle measuring device according to claim 1, further comprising an analog circuit adapted to generate the overall signal from the first signal and the third signal.

4. The inductive angle measuring device according to claim 3, wherein the analog circuit is adapted to generate the overall signal by performing an addition or subtraction operation on the first signal and the third signal.

5. The inductive angle measuring device according to claim 1, wherein the overall signal is formed by performing an addition or subtraction operation on the first signal and the third signal.

6. The inductive angle measuring device according to claim 1, further comprising a circuit adapted to generate the absolute angle position information from the overall signal and the second signal by a Nonius method.

7. The inductive angle measuring device according to claim 6, wherein the circuit is arranged as a digital circuit.

8. The inductive angle measuring device according to claim 1, wherein the scanning element includes a radially inner first scanning track, including the first receiver conductor and at least one segment of the exciter line arranged at an effective first radial distance from the first receiver conductor, and a radially outer third scanning track, including the third receiver conductor and at least one segment of the exciter line arranged at an effective third radial distance from the third receiver conductor, the first effective radial distance being greater than the third effective radial distance.

9. The inductive angle measuring device according to claim 1, wherein the second signal period is greater than the first signal period and greater than the third signal period.

10. The inductive angle measuring device according to claim 1, wherein the first scale track extends along a first circular arc and has a first radial centerline having a first radius, the second scale track extends along a second circular arc and has a second radial centerline having a second radius, and the third scale track extends along a third circular arc and has a third radial centerline having a third radius, the following relationship being satisfied:

$$(r2'-r1') \neq (r3'-r2'),$$

r1' representing the first radius, r2' representing the second radius, and r3' representing the third radius.

11. The inductive angle measuring device according to claim 10, wherein the following relationship is satisfied:

$$(r2'-r1')-(r3'-r2').$$

12. The inductive angle measuring device according to claim 1, wherein the scanning element is adapted to scan the scale element only over at least one segment.

13. The inductive angle measuring device according to claim 12, wherein the segment extends over an angle of less than 180°.

14. The inductive angle measuring device according to claim 1, wherein the segment extends over an angle of less than 120°.

15. The inductive angle measuring device according to claim 1, wherein the first receiver conductor has an angle-related first period, the third receiver conductor has an angle-related third period equal to the first period.

16. The inductive angle measuring device according to claim 15, wherein the second receiver conductor has an angle-related second period greater than the first period.

17. An inductive angle measuring device, comprising:
   a scale element including a first scale track having periodically-arranged first scale structures, a second scale track having periodically-arranged second scale structures, and a third scale track having periodically-arranged third scale structures disposed periodically, the first scale track and the third scale track including an equal first number of scale structures over a predetermined angle range, the second scale track including a second number of scale structures different from the first number, the first, second, and third scale tracks being arranged concentrically about an axis, the first scale track being arranged radially inwardly, the second scale track being arranged radially between the first scale track and the third scale track, the third scale track being arranged radially outwardly; and a scanning element including an exciter line, a first receiver conductor adapted to scan the first scale track to generate a first signal having an angle-related first signal period, a second receiver conductor adapted to scan the second scale track to generate a second signal having an angle-related second signal period, and a third receiver conductor adapted to scan the third scale track to generate a third signal having an angle-related third signal period;

wherein the first signal period is equal to the third signal period and an overall signal is generatable from the first signal and the third signal and is combinable with the second signal to determine absolute angle position information; and wherein the first scale track extends along a first circular arc and has a first radial centerline having a first radius, the second scale track extends along a second circular arc and has a second radial centerline having a second radius, and the third scale track extends along a third circular arc and has a third radial centerline having a third radius, the following relationship being satisfied:

$$(r2'-r1') \neq (r3'-r2'),$$

r1' representing the first radius, r2' representing the second radius, and r3' representing the third radius.

18. The inductive angle measuring device according to claim 17, wherein the following relationship is satisfied:

$$(r2'-r1') < (r3'-r2').$$

* * * * *